INVENTORS
ERNEST C. EVANS
GENE W. RAY

BY Robert A. Priddy
THEIR ATTORNEY

United States Patent Office 3,226,973
Patented Jan. 4, 1966

3,226,973
MASS FLOW MEASUREMENT METHODS
AND APPARATUS
Ernest C. Evans, 139 N. Seneca Road, Oak Ridge, Tenn., and Gene W. Ray, 2215 Sylvania Ave., Knoxville, Tenn.
Filed Aug. 9, 1963, Ser. No. 301,013
20 Claims. (Cl. 73—3)

This invention relates to methods and apparatus for conducting mass flow measurements with a high degree of accuracy and precision. More particularly, the invention relates to methods and apparatus for absolute standard gas mass flow measurements.

Recent technological breakthroughs have made available various kinds of meters which exhibit very high degrees of accuracy (freedom from error) and precision (repeatability of results) in measuring gas flow in terms of mass. These improved flow meters have created a demand for proving, checking and calibrating equipment of great accuracy and precision. One type of prover which has been suggested to fulfill this demand consists of a container having its outlet connected to a pressure regulator, the pressure regulator being connected in turn to the flow meter to be tested, and the flow meter being connected in turn to opposed critical nozzles, the entire assembly being supported on a scale. It has been reported by Halsell and Trekell in the Proceedings of the Nineteenth Annual Appalachian Gas Measurement Short Course, West Virginia University, 1959, pp. 471–477, that such a prover has been used to calibrate a total-flow-indicating flow meter for operation at mass flows of from 700 to 18,000 pounds of gas per hour. It was claimed that a calibration accuracy of 0.1% was obtained by: recording the weight indicated on the scale; allowing about 250 pounds of air to flow out of the container through the pressure regulator, flow-meter and critical nozzles; recording the weight indicated by the scales after the release of air; and comparing the loss in weight as indicated by the scale with the increase in totalized mass units registered by the flow-meter.

The above-described literature reference did not suggest how one might proceed to develop methods and apparatus for the direct calibration of rate-indicating flow meters—flow meters which register in terms of mass units per unit of time. Also, it is evident that Halsell and Trekell were not concerned with measuring low flow rates, i.e. 1.0 to 60 grams per minute, since errors which would normally be expected to arise in their loss of weight determination, such as from buoyancy effects of the atmosphere on the gas container, were apparently ignored. Also, no means was suggested for eliminating the "inventory effect"—the inevitable effect on accuracy which results from the internal volume of the test system.

Among the objects of this invention are the provision of apparatus: (1) for the direct calibration of rate-indicating mass flow meters; (2) primarily intended for gas mass flow rate determinations, but also adaptable to the determination of total mass flow; (3) for determining gas mass flow in terms of totalized mass units or mass units per unit of time, especially at low rates of flow; (4) for taking gas mass flow measurements which are not rendered inaccurate by buoyancy effects; (5) for performing gas mass flow measurements with substantially complete freedom from error attributable to the inventory effect. Further objects and advantages of the invention will be readily discerned in the accompanying drawings and in the remainder of the specification by persons having ordinary skill in the art.

With regard to the attainment of the above objects, we have provided a gas mass flow measurement system wherein there are means for causing gas to flow at a constant rate and for a known time interval through a "test object" (a flow meter or other device whose gas mass flow measurements are to be taken). Means are provided for automatically terminating gas flow through the system. Means are also provided for determining the mass of gas which flows during said interval. When means of the character described are used for rate determinations or for the calibration of rate-indicating flow meters, the measured mass may be divided by the number of time units in the known time interval to obtain the gas mass flow rate directly.

Two of the many possible embodiments of our invention are shown in the accompanying schematic drawings, in which like reference numerals refer to the same parts in each of the figures. In the drawings.

Figure 1:
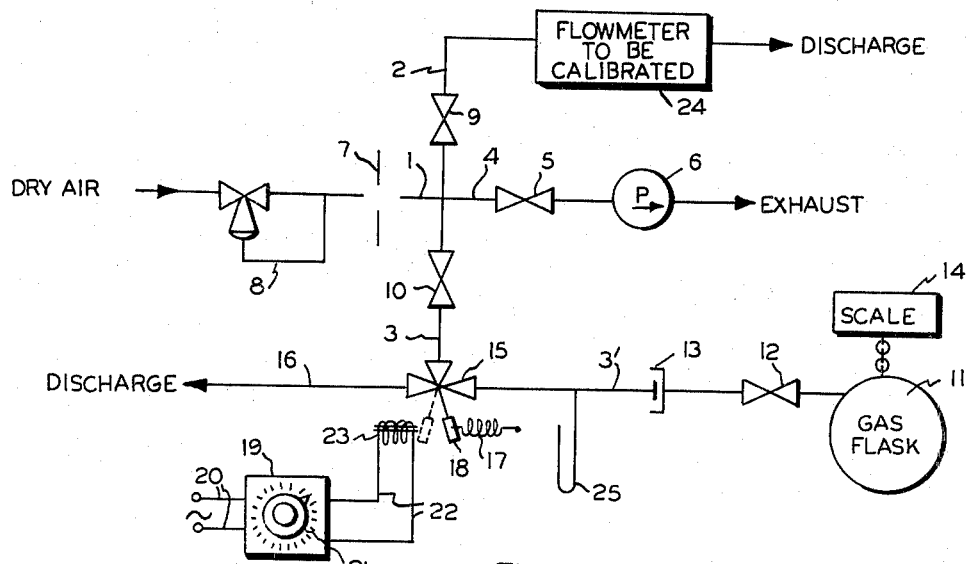
FIGURE 1 is a diagram of the first embodiment of the invention.

Referring now to FIGURE 1, it will be observed that there is a gas-tight conduit system, including an input line 1 which is common to each of two branch lines 2 and 3. The conduit system is provided with an evacuation line 4, in which are located a cut-off valve 5 and a vacuum pump 6, the pump being adapted to exhaust gas from the conduit system to the atmosphere or any suitable container.

The apparatus is provided with introducing means for introducing gas into the input line at a constant rate. The introducing means includes an orifice 7 and a pressure regulator device 8. The regulator is in turn connected to any suitable supply of gas which is to be used for test purposes. The gas is preferably dry, and in this embodiment it is dry air.

The characteristics of the regulating device and orifice and the pressure of the gas in the supply of test gas should be such as to produce critical flow in the orifice 7 during the normal operation of the test apparatus. The phenomenon of critical flow is discussed in Perry's Chemical Engineers' Handbook, Textbook Edition, 1950, pp. 402–403. For a given set of upstream conditions the discharge of a gas from a nozzle, venturi tube or orifice will theoretically increase for a decrease in the value of the absolute pressure ratio, $p_2/p_1$, of the downstream pressure divided by the upstream pressure until the linear velocity in the throat reaches that of sound in the gas at that point. The value of $p_2/p_1$ for which the acoustic velocity is just attained is called the critical pressure ratio, and this may be calculated for nozzles, orifices and the like for perfect gases. Thus, it should be apparent that the regulator-orifice combination can function to introduced gas into the input line at a relatively constant rate, provided the proper pressure and temperature conditions are maintained. That is, neither upstream pressure nor the temperature of the system should change significantly during the time the flow meter is calibrated in a given test. Since the mass flow is proportional to the square root of the absolute temperature, however, small changes in temperature will have little effect on the accuracy of a given determination. As the description proceeds, it will be readily apparent that any other means can be substituted for the regulator and orifice, provided that such means are able to maintain a constant flow rate.

This invention also includes means for directing all of the gas which has been introduced into the input line into either of the branch lines. In this embodiment, this function is carried out by a valve 9 in branch line 2 and a corresponding valve 10 in branch line 3. The cut-off valve 5 in evacuation line 4 contributes to this function in that it prevents gas from leaking off through the vacuum pump 6 when it is not in use. It should also be evident that the valves 5, 9 and 10 could easily be replaced by other means for carrying out a similar function. For instance, a valve having four ports and a three-way rotatable valve element could be stationed at the junction of lines 1, 2, 3 and 4.

The first branch line is adapted to connect with a test object, a flow meter being the preferred example. In this embodiment the input end of the flow meter communicates with the valve 9 and the output thereof discharges into the atmosphere or into any desired enclosure. If desired, throttle valves may be inserted in the system just upstream and/or downstream of the flow meter.

A gas flask is connected to the second branch line. The flask can be of any reasonably rigid material which has sufficient strength to withstand the operating pressures of the system. We have found spherical glass and Fiberglas-reinforced plastic spheres to be especially desirable. In this embodiment, the only opening of a glass gas flask 11 is connected to line 3', which constitutes a continuation of the second branch line.

Immediately adjacent flask 11 in line 3' is an isolation valve 12. Just upstream of valve 12 is a manually disconnectable coupling 13. The flask 11, valve 12 and half of the coupling 13 are associated with a scale 14 adapted to register their combined mass, including the mass of any gas contained within them. The purpose of the valve 12 and coupling 13 is to permit the contents of the flask to be weighed independently of the remainder of the apparatus in the system. The valve 12 isolates the contents of the flask from the atmosphere while the coupling 13 is broken for purposes of weighing. Of course, if it were found desirable, any portion or all of the system could be associated with the scale so as to be weighed thereby. If the entire system were associated with the scale so as to be weighed thereby, the coupling 13 and valve 12 would no longer be essential and could be eliminated. However, the extra burden on the scale would result in a loss of sensitivity that would correspondingly decrease the accuracy and precision of the apparatus. In any event, whether the system is arranged so that the flask is weighed alone or in conjunction with other portions of the apparatus, it may be said that the flask is associated with some means for weighing it.

Anywhere in that portion of the conduit system that is intermediate the gas flask and the introducing means is a valve means which is adapted to discharge gas from that portion of the system. In this embodiment, the discharge means is a three-way valve 15 having an inlet connected to second branch line 3 and a pair of outlets connected to line 3' and discharge line 16 respectively. The valve is constructed in such a manner that it is able to direct air from line 3 to either line 3' or line 16, without leakage from one of said lines to the other. We prefer to use a three-way snap-action valve.

The invention also includes means for causing the above described valve means to remain closed for a known time interval while a test object is being tested and for opening the valve means at the end of said interval. From the above discussion, it should be apparent that the valve means 15 has two positions, one of which will cause the discharge of all gas to line 16. For purposes of this disclosure we regard that position as the "open" position. When the valve means is in its other position it is able to direct all gas into line 3'. Although this valve is never truly closed in the sense that nothing can pass through it, we regard this latter position as the "closed" position for purposes of this disclosure, especially in view of the fact that this position "closes" the discharge line 16, preventing further escape of air or other test gas from the system. It should also be apparent that this function of closing off the discharge line is the primary function of the valve means. Thus, any other means capable of carrying out this function may be substituted for the valve 15.

In this embodiment the means for opening the valve is a spring 17 which is connected to valve control lever 18 so that it biases it towards the open position. Any number of devices could be substituted for the spring, such as a counterweight, magnet, or solenoid.

The means for causing the valve means to remain closed for a known time interval may include a wide variety of devices. In this embodiment, such means include a timer 19, which is connectable to a source of alternating current by a line cord 20. The timer is of a well known type that is able to deliver an output current of any predetermined duration within a given range of time intervals. The timer is provided with a knob 21 or other means for varying the duration of its output current. The output of the timer is connected by circuit 22 with a solenoid 23 or other power means able to overcome the effect of spring 17.

From the standpoint of accuracy, it is important that the solenoid 23 and spring 17 each be capable of operating the control lever quite quickly, so that length of the interval when the valve is closed corresponds as nearly as is practicable or possible with the duration of the timer output signal. When the valve takes longer to open than it does to close, or vice versa, it may be found desirable or even necessary to "calibrate" the valve. That is, the difference in time between the period when the valve is actually closed on the one hand and the duration of the output current from the timer would be measured and applied as a correction factor to the time data in the mass flow rate determination. Such a correction factor becomes less essential as the length of the timer operating interval is increased.

When attempting to build the highest possible degree of accuracy and precision into our system, it appears desirable to replace the spring 17 with a solenoid which is identical with the solenoid 23. The timer is modified by providing a second output circuit for the second solenoid and is further modified so that it will energize this second circuit when it shuts off the solenoid 23. By using two solenoids and a timer modified in the above described fashion, instead of a solenoid and a spring, it is possible to obtain more equal opening and closing times in the operation of the valve 15.

A useful accessory to this embodiment of the invention is a pressure gage 25 which should be located somewhere in the system between the orifice 7 and the gas flask 11. It is useful in checking the system for leakage, in following the progress of the evacuation of the system, in monitoring the pressure downstream of the orifice to make sure that critical flow conditions are maintained and in various other respects. In this embodiment, the pressure gage is an open-tube manometer, and it communicates with line 3' between valve 15 and coupling 13.

The calibration of a flow meter with the above described embodiment will be described now. Valve 9 is closed. Valves 5, 10 and 12 are opened. Valve 15, which normally remains open, is closed at this time. This may be accomplished by manually holding it closed against the action of spring 17, or by means of an auxiliary circuit (not shown) for energizing solenoid circuit 22, or by turning the timer 19 "on" with the dial set to an indefinitely long operating interval. Then, evacuation pump 6 is operated to evacuate lines 4, 1, 3 and 3' and gas flask 11. Pumping is continued until any desired reduction in the pressure within the flask is achieved. Preferably the pressure therein is decreased to a few mm. Hg abs. (torr). Valves 12 and 5 are closed. Next, the regulator is opened long enough to restore atmospheric pressure to the conduit system. Then the coupling 13 is broken. A mass reading is taken from the scale 14, whereupon the coupling 13 is again connected. With the regulator 8 and valve 12 securely closed and with valve 5 opened, the lines 4, 1, 3 and 3' are again evacuated to a very low pressure to remove any moist air that might have entered the system while coupling 13 was broken. Then the valve 5 is closed and the regulator is "cracked" open. Test gas is allowed to build up in line 3' until some predetermined pressure is attained—the predetermined pressure being approximately that which is expected to prevail later on in line 3' when the filling of the gas flask with test gas has been completed. Upon attainment of the predetermined pressure, valve 15 is immediately allowed to open, sealing off line 3' and interconnecting lines 3 and 16. Then valve 12 is opened and the pressures in line 3' and flask 11 equalize.

A rate indicating mass flow meter, such as the flow meter 24, is connected to the line 2. With the valves 10 and 5 closed and with valve 9 opened, dry air is admitted to the system through regulator 8 and orifice 7. From there it flows through valve 9 and flow meter 24 and is discharged. The regulator is set to maintain a pressure on the upstream side of the orifice that is sufficient to insure critical flow conditions at the orifice. When critical flow conditions have been established, and the flow meter has stabilized, the rate indicated by the flow meter is recorded.

It should be noted parenthetically that consideration should be given to the back pressure of the flow meter and the aforesaid predetermined pressure in setting the regulator 8, since the pressure upstream of orifice 7 must always be sufficiently great during the actual test sequences to maintain critical flow conditions; that is, the pressure setting on regulator 8 must be, at the least, great enough so that the flow rate through the orifice is independent of the back pressure thereon over the range of back pressures expected to be applied thereto during a flow rate measurement. Thus, it should be apparent that there is a minimum acceptable pressure setting for the regulator 8 for a given flow meter and predetermined pressure. If the regulator is set to pressures above the minimum acceptable value, the density of the gas passing through the orifice will be increased. Thus, although critical flow conditions will still be obtained, the increased density will increase the rate of mass flow, the mass flow rates being proportional to the absolute upstream pressure. See Fligner's equation, p. 403, Chemical Engineers' Handbook, supra. This makes it possible to use a single orifice to calibrate a flow meter at various mass flow rates.

The atmospheric pressure prevailing at the location where the calibration is to take place is a convenient predetermined pressure to work with, assuming that it will remain, reasonably constant throughout a given calibration run. However, any other convenient predetermined pressure may be adopted.

After the regulator 8 has been properly set, the timer 19 is set by means of dial 21 to energize the circuit 22 for any predetermined interval of time. For the sake of accuracy, it is of course, best to choose an interval that will result in a final pressure which approximates the aforesaid predetermined pressure. By final pressure is meant the pressure prevailing in line 3' when the taking of the test gas sample in the collection flask is completed.

Upon the starting of the timer and energization of circuit 22, the valve operating lever 18, which normally remains in the position shown in FIGURE 1, is moved by solenoid 23 to the position indicated in dotted outline—despite the contrary pull of spring 17. This closes the valve 15 and instantaneously diverts the flow of gas from discharge line 16 into line 3'. The gas continues down line 3' and through the coupling 13 and valve 12 into gas flask 11. At the end of the predetermined interval set on the timer, the circuit 22 is de-energized, the solenoid 23 releases the valve operating lever 18, and the spring 17 again opens the valve 15, diverting the flow of test gas back into discharge line 16. Then the valve 12 is closed and the coupling 13 is broken so that a new mass reading may be taken from the scale 14.

The time setting initially made on timer 19 and the differences in the mass readings on the scale before and after the timed interval of flow constitute the raw data from which the mass flow rate may be calculated. Various corrections may be applied to this raw data to increase its accuracy. For instance, the time may be corrected for any bias existing in the valve 15, as explained above. The timer accuracy may be checked and, if necessary, compensated for by comparing its output with signals from radio station WWV in accordance with the method set forth in Instruments and Control Systems, August 1960, p. 1341. The mass determination may be corrected for error in the scale, for the effect of buoyancy and static electricity on the flask 11, and for any volume change occurring in sphere A due to temperature and pressure changes therein. The desirability and necessity of these and other possible corrections depends upon the degree of accuracy required for the particular mass rate determination and upon the characteristics of the equipment and operating techniques used. In any event, the mass and time data—in raw or corrected form—are used to calculate a mass flow rate.

The value thus obtained may be compared directly with the reading initially taken from the flow meter. This is readily understood if one remembers that critical flow conditions prevailed in orifice 7 both when the flow meter 24 was initially read and when the gas flask 11 was being filled with test gas. Therefore, the actual rate of flow through the flow meter 24 during the first part of the test and the actual rate of flow into flask 11 during the latter part of the test must have been the same. With orifices of different sizes it is of course possible to calibrate a flow meter over a wide range of mass flow rates.

The "inventory" is the gas remaining between valves 15 and 12 after the timed flow of gas ceases. Failure of the inventory to reach the weighing flask and enter into the second weighing thereof is the "inventory effect." We eliminate this potential source of error by introducing a compensating quantity of gas into the system downstream of valve 15 before the timed flow begins. If the compensating gas is introduced by filling the line between valves 15 and 12 to a predetermined pressure at which the timed flow will be halted automatically, and the temperature and volume of the system remain reasonably constant, then the mass flow determination will be correspondingly freed of error from the inventory effect. The embodiment disclosed in FIGURE 2 is ideally suited for this technique, since it possesses the requisite automatic means for halting the timed flow of test gas in response to the development of a predetermined pressure in the inventory.

Figure 2:
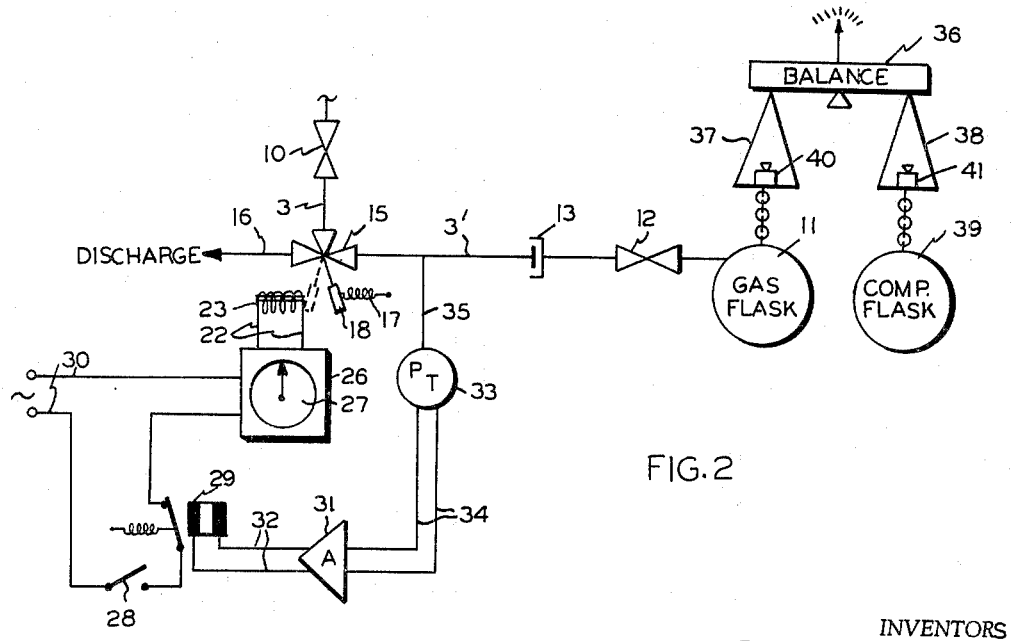
FIGURE 2 is a diagram of the second embodiment, which both resembles and departs from the first embodiment in various respects.

The second embodiment is shown only partially in FIGURE 2, because a substantial portion thereof is identical to the first embodiment shown in FIGURE 1. The second embodiment includes: a regulator 8; orifice 7; pump 6; lines 1, 2, 3, 3', 4 and 16; valves 5, 9, 10, 12 and 15; coupling 13; gas flask 11; valve operating lever 18; return spring 17; solenoid 23; and solenoid operating circuit 22. The above parts all perform the same functions in this embodiment as in the first one and all are related to one another in the same way.

However, the second embodiment differs from the first in that it has a clock 26 rather than a timer. The clock does not control the duration of the current flow in solenoid circuit 22. It merely indicates said duration on an indicator dial 27. The clock is connected to an input circuit 30 which is connectable to a source of electric power. The clock is so wired internally that the solenoid circuit 22 and the means for operating the hand on the indicator dial both derive their power directly from input circuit 30. The clock and circuit 22 are preferably wired in parallel.

In the input circuit 30 are a single pole-single throw switch 28 and a relay 29. The relay is of the normally closed variety. It is connected to the output end of amplifier 31 through an amplifier-relay circuit 32. The input of the amplifier 31 is connected with the output of a pressure transducer 33 through an amplifier-transducer circuit 34. The relay, amplifier and transducer are assembled and adjusted in such a manner that when a pressure of one atmosphere is detected by the transducer it will cause the relay 29 to operate and break the clock input circuit 30. The pressure input of the pressure transducer is connected by a short length of conduit 35 to conduit 3' between valve 15 and coupling 13.

The second embodiment also differs from the first in regard to the weighing means provided for determining the mass of gas entering the gas flask 11. Instead of a scale, the second embodiment is provided with an analytical balance 36, having two arms carrying pans 37 and 38. Gas flask 11 is suspended from one arm by pan 37. A "comparable" flask 39 is suspended from the other arm by pan 38. The flask 39 is comparable to flask 11 in the sense that it is of equivalent volume, shape and mass. Thus, it counter-balances the mass of gas flask 11 on the balance and at the same time, offsets atmospheric buoyancy effects on flask 11 by responding to said effects to the same extent as flask 11. The flask 39 should be sealed so that it will displace its full volume of air for correct buoyancy compensation.

The calibration of a flow meter with this embodiment of the invention begins with preparing the system for evacuation by closing valve 9 and regulator 8, and by opening valves 5, 10 and 12. Valve 15, which normally remains open, is closed at this time. This may be accomplished manually or by means of an auxiliary solenoid energizing circuit as described above with regard to the first embodiment. The clock input circuit switch 28 could also be used to temporarily close valve 15 if some means were provided to temporarily defeat the relay 29, such as a defeat switch (not shown) in circuit 32 or circuit 34.

With valve 15 closed, evacuation pump 6 is operated to evacuate lines 4, 1, 3 and 3' and gas flask 11 to a few mm. Hg abs, (torr). Now valves 12 and 5 are closed and atmospheric pressure is allowed to build up in the conduit system upstream of valve 12 by admitting test gas through the regulator. Then, coupling 13 is broken. Since flask 39 retains whatever gas content it originally had, regardless of the evacuation of gas flask 11, the evacuation of flask 11 makes said flask much lighter than flask 39 causing the left arm of the balance 36 to rise. The balance is restored to null position by placing masses 40 on the left balanced pan 37. Then coupling 13 is reconnected.

With the regulator 8 and valves 9, 12 and 15 closed, and with valves 5 and 10 opened, the lines 4, 1, 3 and 3' are re-evacuated to remove moist air from the system. Then valve 5 is closed and test gas is again allowed to build up in line 3' until atmospheric pressure has been attained. Upon attainment of atmospheric pressure in line 3', whatever means were used to maintain valve 15 in closed position are released, the valve is allowed to open and line 3' is sealed off containing test gas at atmospheric pressure. Then valve 12 is opened, thus allowing the pressures in line 3' and flask 11 to equalize.

Now valve 10 is closed and valve 9 is opened. Dry air is caused to flow through the regulator 8, orifice 7, input line 1, valve 9, branch line 2 and flow meter 24. When the flow meter has stabilized, the rate indicated thereon is recorded.

Next valve 10 is opened, and valve 9 is closed. Thus, the entire flow of test gas goes through the regulator and orifice into input line 1, down through valve 10 and line 3 into the valve 15 and out of the system through line 16. At this time the switch 28 and relay 29 are in their normal positions, opened and closed respectively. The pressure in line 3' and at the transducer is of course well below atmospheric, since the atmospheric pressure previously prevailing therein was dissipated by equalization of pressures with gas flask 11. The system is now in readiness for a mass determination.

The timed determination begins with the closing of switch 28. Instantly, the clock 26 and solenoid 23 are energized—immediately closing the valve 15 and diverting the flow of gas from line 16 into line 3'. The resultant change in back pressure on orifice 7 has no substantial effect on the flow of test gas through orifice 7, because it is operating under critical flow conditions. Therefore, test gas now flows through regulator 8, orifice 7, valve 10, line 3, valve 15 and line 3' into gas flask 11 at the same rate it flowed through the flow meter 24 in the first stage of the test. Eventually, the pressure in line 3' must reach atmospheric pressure. Then, pressure transducer 33, amplifier 31 and relay 29 cooperate to break the clock input circuit 30, thus de-energizing the clock 26 and solenoid simultaneously. With the solenoid de-energized, the valve 15 is immediately returned to open position by spring 17.

The interval during which test gas flowed into the gas flask 11 may now be read directly from the clock indicator 27.

The balance is again returned to null position by placing more masses 41 on the right pan 38 of the balance. From the time indicated by clock 26 and the amount of mass added to balance pan 38, the flow rate may be calculated with whatever corrections are deemed desirable and necessary. Then the observed rate may be compared with that recorded initially on the flow meter.

Although the use of the invention has been illustrated in connection with the calibration of a flow meter, it should be appreciated that the invention has other uses. Such other uses might call for modifications of the system which would nevertheless fall within the scope of our invention. For instance, if one desired to calibrate a number of orifices under critical flow conditions, the branch line 2, valve 9, orifice 7 and flow meter 24 could be eliminated entirely, and the orifices to be tested could be inserted in the input line downstream of the regulator, the input line being adapted in such a case to readily receive the various orifices to be tested. The operation of such a system would be identical in most respects to that of the first embodiment described above, except that the initial manipulation of the system to obtain a reading on the flow meter would of course be dispensed with. Thus, it is apparent that the first branch line could be omited from the system. Also, it is evident that the system could be constructed with a pressure regulator but without an orifice, the user inserting the orifices or other devices that he desires to test into the system between the regulator 8 and the valve means 15.

The system has been illustrated with an evacuation line. Evacuation is needed if one desires to start with the collection flask evacuated or partially evacuated when making a mass rate determination. Although it would reduce the sensitivity of the weighing apparatus and require a higher test gas pressure, it would be possible to utilize our invention for determinations wherein the collection of gas begins with the flask containing test gas at atmospheric pressure, or higher. Therefore, the evacuation pump is not essential to all possible uses of the invention and might be omitted. In the absence of the pump, the evacuation line could serve as an exhaust line.

From the above description of embodiments of our invention and their operation, it should be apparent that we have provided a new method of determining mass flow rates, to wit: causing test gas to flow at a constant rate into a conduit system and passing the entire flow out of said system again through discharge means; diverting said entire flow from said discharge means into a previously sealed and weighed gas collection flask for a limited, timed interval; at the conclusion of said interval, halting the flow of gas into said flask and sealing it again; and again weighing the flask to determine its gain in mass, whereby the mass flow rate may be determined directly from the length of said interval and the gain in mass. The diversion of the flow from the flask is preferably accomplished automatically, either in response to the expiration of a predetermined time interval or in response to the development of a predetermined pressure in the system, i.e., between the discharge means and the glas collection flask. The preferred form of our method also includes the additional step of introducing a compensating quantity of test gas into the system between the gas flask and discharge means before the timed flow begins, thus avoiding errors which would otherwise result from the "inventory effect." A preferred mode of halting the flow of gas into the collection flask involves diverting the flow away from the flask and simultaneously sealing it.

Our new method has the advantage that when the collection of gas begins, the flow of gas has already been established. Thus, from the very beginning, the collection of test gas may take place at a constant rate. This advantage will be realized to the fullest extent when the diversion of the flowing test gas into the collection flask occurs quickly and without any obstruction of the flow of test gas. However, it will readily be appreciated by persons skilled in the art that the advantage set forth above will be attained to some extent, even if the step of diverting the flow into the collection flask does have small temporary effects upon the rate of flow of test gas. Therefore, unless the act diverting the flow of gas into the flask substantially halts the flow of test gas, some benefit will be obtained in the practice of our method.

In conclusion, while the foregoing specification and drawing describe the construction, operation and use of certain preferred embodiments of the instant invention, it is to be understood that we do not intend to limit ourselves to the precise constructions and arrangements herein disclosed, since the various details of construction, form and arrangement may obviously be varied to a considerable extent by anyone skilled in the art without really departing from the basic principles and novel teachings of this invention and without sacrificing any of its advantages. Accordingly, the appended claims are intended to encompass all changes, variations, modifications and equivalents falling within the scope of our invention.

What we desire to protect by United States Letters Patent is:

1. Apparatus for proving a mass flow meter, comprising a conduit system having first and second branch lines, each communicating with a common input line; introducing means for introducing gas at a constant rate into the input line; means for directing all gas so introduced into either of the branch lines; the first branch line being adapted to connect with a flow meter which is to be tested; a gas collection flask connected to the second branch line; means for weighing the flask; in the conduit system, intermediate the gas flask and the introducing means, valve means having a normal position (A) wherein the introducing means is in communication with a discharge outlet and the flask is sealed, and (B) another position in which the introducing means is in communication with the flask and the discharge outlet is closed; and means for causing the valve means to remain in position (B) for an interval of time and for moving the valve means to position (A) at the end of the interval.

2. Apparatus according to claim 1 wherein there is an evacuation line in the conduit system.

3. Apparatus according to claim 2 wherein there is an evacuation pump in the evacuation line.

4. Apparatus according to claim 1 wherein the introducing means includes a pressure regulator and a critical flow orifice downstream of the regulator in the input line.

5. Apparatus according to claim 1 wherein the valve means is a three-way snap action valve, having an input port connected to the second branch line, a first output port communicating with a discharge line, a second output port communicating with the gas collection flask and means within the valve for diverting all gas received through the input port to either of the output ports.

6. Apparatus according to claim 1 wherein the weighing means includes a two-arm balance having the gas collection flask suspended from one arm and a comparable sealed flask suspended from the other arm.

7. Apparatus according to claim 1 wherein the means for causing the valve means to remain in position (B) includes a solenoid and a solenoid operating circuit.

8. Apparatus according to claim 7 wherein the solenoid energizing circuit is connected to electric timer means adapted to energize the circuit for a predetermined interval of time.

9. Apparatus according to claim 1 wherein the means for returning the valve means to position (A) at the end of the interval includes pressure responsive means in the conduit system adapted to operate the valve means in response to the development of a predetermined pressure in the conduit system.

10. Gas mass flow rate determination apparatus, comprising a conduit system having an input line; pressure regulator means in the input line; the input line being adapted to receive a test object downstream of the pressure regulator; a gas collection flask in communication with the input line; counterbalancing means of equivalent volume, shape and mass to the gas collection flask in counterbalancing relationship with the flask for offsetting atmospheric buoyancy effects thereon; weighing means for weighing the flask; in the conduit system, intermediate the flask and the input line, valve means having a normal position (A) wherein the input line is in communication with a discharge outlet and the flask is sealed, and (B) another position in which the input line is in communication with the flask and the discharge outlet is closed; and means for causing the valve means to remain in position (B) for an interval of time and for moving the valve means to position (A) at the end of the interval.

11. Apparatus according to claim 10 wherein the means for causing the valve means to remain in position (B) includes a solenoid and a solenoid operating circuit.

12. Apparatus according to claim 11 wherein the solenoid energizing circuit is connected to electric timer means adapted to energize the circuit for a predetermined interval of time.

13. Apparatus according to claim 10 wherein the means for returning the valve means to position (A) at the end of the interval includes means in the conduit system responsive to the development of a predetermined pressure in the conduit system.

14. A method for the determination of mass flow rates, comprising: causing test gas to flow at a constant rate into a conduit system and passing the entire flow out of said system again through discharge means; diverting said entire flow from said discharge means into a previously sealed and weighed gas collection flask for a limited time interval; at the conclusion of said interval, halting the flow of gas into said flask and sealing it again; again weighing the flask to determine its gain in mass and, during said weighing, counterbalancing said gas collection flask with means of equivalent volume, shape and mass with respect to said flask for offsetting atmospheric buoyancy effects thereon, whereby the mass flow rate may be determined directly from the length of said interval and the gain in mass.

15. A method in accordance with claim 14 wherein the halting of the flow of gas into said collection flask is accomplished by diverting the flow away from the flask and simultaneously sealing it.

16. A method in accordance with claim 15 wherein the diversion of flow from the flask is accomplished automatically in response to the expiration of a predetermined time interval.

17. A method according to claim 15 wherein the diversion of flow from the flask is accomplished automatically in response to the development of a predetermined pressure in the conduit system.

18. A method according to claim 17 wherein the predetermined pressure is measured at a point in the conduit system lying between the discharge means and the gas flask.

19. A method in accordance with claim 14 wherein a compensating quantity of gas is introduced into the system between the gas flask and discharge means prior to the diverting of said entire flow thereto.

20. In a method of measuring gas flow with apparatus comprising a gas introducing means, a gas collection flask and a conduit system interconnecting the gas introducing means and the flask, wherein the gas flow is caused to occur from the source through the conduit system into the flask until a predetermined pressure of gas is attained in the conduit system and flask and a determination is made of the amount of gas flow that has taken place, the improvement which comprises reducing errors in the determination, arising out of the inventory effect of the conduit system, by introducing sufficient gas into the conduit system prior to the initiation of the said gas flow to produce approximately said predetermined pressure in the conduit system.

References Cited by the Examiner

UNITED STATES PATENTS 3,026,706  3/1962  Halsell et al. _____ 73—3

OTHER REFERENCES

Andersen et al.: Review of Scientific Instruments, vol. 20, No. 1, January 1949, pp. 61 to 66.

Strauss et al.: Review of Scientific Instruments, vol. 30, No. 4, April 1959, pp. 258–259.

DAVID SCHONBERG, *Primary Examiner.*

LOUIS R. PRINCE, *Examiner.*

S. CLEMENT SWISHER, *Assistant Examiner.*